Patented Jan. 18, 1944

2,339,388

UNITED STATES PATENT OFFICE 2,339,388

ISOLATION OF META-CRESOL

Karl H. Engel, West Englewood, N. J., assignor, by mesne assignments, to Allied Chemical & Dye Corporation, a corporation of New York No Drawing. Application June 20, 1940, Serial No. 341,444

6 Claims. (Cl. 260—621)

This invention relates to improvements in the separation of meta-cresol from a physical mixture of meta- and para-cresols.

Dawson and Mountford (J. C. S. 113, 923–35, 1918) showed that at or below certain appropriate temperatures phenol forms solid crystalline addition products with ortho-cresol, meta-cresol and para-cresol; and also that the individual cresols form addition products with one another.

It has of course been common industrial practice for many years to separate phenol from mixtures of the cresols by fractional distillation and to separate ortho-cresol of purity approximately 98%–100% by the same method. A mixture of meta- and para-cresols has readily been obtained by fractional distillation, but since the boiling points of the meta- and para-isomers are so close together, separation of the individual pure products by distillation has been commercially impracticable. Furthermore, meta- and para-isomers cannot readily be separated by fractional crystallization.

A present market requirement for pure meta-cresol is that it contain not less than about 98% meta-cresol. It is an object of this invention to provide a process for producing meta-cresol of such high purity from commercial mixtures of meta-para-cresol which may contain as much as about 25% of other tar acids such as the ortho-cresol and the xylenols.

As a result of my extensive research work in this field, I have made the surprising discovery that by carefully regulating the amount of phenol added to a mixture of meta- and para-cresol containing not less than about 35% meta-cresol and cooling the resultant mixture to a predetermined temperature, a phenol-meta-cresol addition compound substantially free of para-cresol can be produced, which compound can readily be resolved into its components to yield a meta-cresol of 98% purity or higher. The amount of phenol added to the meta-para-cresol mixture should be such as to produce a mixture containing about 30% phenol by weight, irrespective of the meta-cresol content of the mixture to which the phenol is added. The amount of phenol may be varied somewhat, but should not be less than about 28% by weight of the total mixture or greatly in excess of about 32% by weight of the total mixture.

The temperature to which the phenol-meta-para-cresol mixture is cooled when 30% by weight of phenol is incorporated in the mixture may be as low as −16° C. to obtain an optimum yield of pure meta-cresol without danger of contaminating the phenol-meta-cresol addition compound with solid para-cresol, para-cresol eutectics or para-cresol addition compounds. However, as the mixture has a high viscosity at such low temperatures, and as adequate yields are obtained when the mixture is cooled to a temperature in the range of −5° to +5° C. without danger of contaminating the phenol-meta-cresol addition compound, the cooling of the mixture may advantageously be conducted to a temperature within the range of −5° to +5° C., preferably about 0° C.

In the production of a high purity meta-cresol product it is important to free the phenol-meta-cresol addition compound from all traces of the para-cresol-containing liquid. As a general rule this cannot be accomplished by filtration, centrifuging or pressing, due to the high viscosity of this liquid and the consequent tenacity with which it adheres to the crystals of phenol-meta-cresol addition compound. The elimination of contaminating liquids by washing the addition compound with another liquid readily suggests itself. It has been found, however, that solvents which a chemist would normally use for this purpose dissolve not only the liquid but also a substantial portion of the addition compound. For example, I have found that water, aliphatic alcohols, ethers, esters, benzene and its homologs, the methyl naphthalenes and chlorinated hydrocarbons such as chloroform, carbon tetrachloride, tetra-chlor-ethane, chlorbenzene and dichlorbenzene mixture, are unsuitable because they dissolve or decompose a substantial portion of the addition compound. I have made the surprising discovery that solvents constituted predominantly of paraffinic hydrocarbons having the type formula $C_nH_{2n+2}$ possess the desirable properties of effecting substantially complete elimination of contaminating liquids from phenol-meta-cresol addition compounds washed therewith without dissolving an appreciable amount of the addition compound. Preferably, and particularly from the standpoint of facilitating separation of the solvent from the phenol and meta or par cresols by distillation, the paraffinic hydrocarbon used should have a boiling range within the limits of 90° to 150° C. or above 215° C.

The aforementioned solvents constituted predominantly of paraffinic hydrocarbons, I have found, have a relatively low viscosity and possess good miscibility with the liquid phase or mother liquor comprising phenol, meta-cresol, para-cresol, etc., but have only a very slight solvent action on the solid phase phenol-meta-cresol addition compound at the low temperatures at which they are used, i. e. —5° to +5° C. and preferably at about 0° C., the temperature to which the phenol-meta-cresol mixture is cooled to obtain the addition compound. The solvents sold under the trade-names of "Lactol," "Kemsolene," and "Forum No. 35," comprising petroleum distillates constituted of paraffinic hydrocarbons boiling in the range of 90° to 130° C., 120° to 150° C. and 291° to 369° C. respectively, have been found satisfactory. The lower boiling solvents are preferred because of lower heat costs involved in effecting separation thereof from the phenols and cresols by distillation.

The presence in the mixture of phenol, meta- and para-cresols of a liquid of low viscosity miscible with the liquid phase but having substantially no solvent action on the phenol-meta-cresol addition compound, I have found, is advantageous, particularly when operating at low temperatures, in that it reduces the viscosity of the liquid phase and hence permits ready and effective separation thereof from the phenol-meta-cresol addition compound. Paraffinic petroleum solvents, preferably within the boiling range of 90° to 150° C. in the proportion of from 5% to 20% by volume of the mixture constituted of phenol and meta-para-cresol, may be incorporated in such mixtures. The incorporation of such solvent facilitates agitation of the mixture, permits more rapid cooling and a more efficient separation of the phenol-meta-cresol addition compound from the liquid phase. Paraffinic petroleum solvents, I have found, do not interfere with the crystallization of the phenol-meta-cresol compound and yields of addition compound are beneficially affected. Furthermore, the use of the petroleum solvent reduces the viscosity of the liquid phase, presumably because the solubility of the phenol-meta-cresol compound is lower, permitting a more rapid attainment of lower crystallization temperature equilibria and subsequent separation of the liquid phase from the addition compound at lower temperatures than would otherwise be possible.

The paraffinic hydrocarbon solvents mixed with the liquid phase or adhering to the crystals of addition compound can be readily removed by treating the meta- or para-cresol compound, as the case may be, with an aqueous alkaline solution and separating the insoluble paraffinic oil. Alternatively, the separation can be effected by distilling either the liquid phase containing the petroleum solvent or the addition compound containing the adhering petroleum solvent.

The following examples will serve to illustrate the principles of my invention:

*Example 1.*—1000 parts of a commercial cresol mixture containing 60.5% meta- and 32.5% para-cresol were mixed with 430 parts of phenol, U. S. P., melting point 40.5° C., in an iron kettle. The mixture was cooled to a temperature of —2° C. Crystallization proceeded rapidly after inoculation with phenol-meta-cresol addition compound and continued over a period of about two hours. The mixture was then agitated for an additional hour at —2° C. to attain equilibrium.

The resulting heavy slurry was transferred to a cold-jacketed suction filter. Mother liquor was drained as far as possible and finally completely removed by washing the crystals with a paraffinic petroleum solvent, boiling range 90° to 130° C., at a temperature of —2° C. in small successive portions, a total of 900 parts being used.

The yield of addition compound was about 285 parts. Freed from solvent and traces of absorbed moisture, the crystals had the correct melting point of the pure addition compound, 26° C. The crystals were melted and transferred to a fractionating still. On distillation there was obtained very nearly 200 parts of meta-cresol having a melting point of 11.6° C. and a purity of 99%, determined by the familiar Raschig method of analysis. (Determination as trinitro-meta-cresol).

*Example 2.*—A commercial mixture of meta-para-cresol containing 65.2% meta-cresol and 34.2% para-cresol was used in this example. Exactly the same quantities of phenol and cresols were used as in Example 1. Procedure was exactly as before, the same quantity of cold paraffinic petroleum solvent, boiling range 90° to 120° C., 900 parts, being used for washing. The yield of solvent-free addition compound in this case was 420 parts, containing 292 parts of meta-cresol. Meta-cresol isolated by fractional distillation from this material had a melting point of 11.3° C., purity 98.5%.

*Example 3.*—1000 parts of a meta-para-cresol mixture containing 72% meta-cresol and 24% para-cresol and about 4% mainly of xylenols were mixed with 450 parts of phenol and 70 parts of paraffinic petroleum solvent of a boiling range 120° to 150° C., and agitated in an iron kettle immersed in a cooling bath. Such meta-para-cresol mixture may be obtained, for example, as a by-product in the manufacture of para-cresol utilizing the process disclosed in my United States Patent No. 2,095,801, of October 12, 1937. The kettle charge was cooled to 2° C. in a period of about 3 hours, agitation at this temperature being continued for another hour. The resulting crystal slurry was transferred to a suction filter. The suction-drained crystals of addition compound were washed with 880 parts of ice-cold petroleum solvent, boiling range 120° to 150° C. Crystals and combined mother and wash liquors were separated into their respective components by fractional distillation as in the preceding examples. The yield of solvent-free addition compound in this case was about 565 parts, its melting point 26° C., and its content of pure meta-cresol 395 parts.

The meta-cresol obtained, isolated by fractionation, had a melting point of 11.8° C., and a purity of 99.4%.

It is to be understood that this invention is not restricted to the present disclosure otherwise than as defined by the appended claims.

I claim:

1. A method of separating meta-cresol from a liquid mixture comprising meta- and para-cresols and containing at least about 35% meta-cresol, which comprises adding phenol to the liquid mixture, adding a paraffinic petroleum solvent to the mixture, cooling the resultant mixture to crystallize out a solid phenol-meta-cresol addition compound, and separating the said addition compound from the solution.

2. A method of separating meta-cresol from a liquid mixture comprising meta- and para-cresols and containing at least 35% meta-cresol, which comprises adding phenol to the mixture, cooling the mixture to a temperature of about —5° to +5° C. to crystallize out a solid phenol-meta-cresol addition compound, separating the addition compound from the mother liquor, and washing the addition compound with a paraffinic petroleum solvent to remove substantially all traces of mother liquor adhering thereto.

3. A method of separating meta-cresol from a liquid mixture comprising meta- and para-cresols and containing at least about 60% meta-cresol, which comprises adding phenol in amount sufficient to produce a mixture containing about 30% phenol, cooling the said mixture to a temperature of about 0° C. to crystallize out a solid phenol-meta-cresol addition compound substantially free of para-cresol, separating the said addition compound from the mother liquor while maintaining the said compound at a temperature of about 0° C., washing the said compound with a paraffinic petroleum solvent at a temperature of about 0° C. to remove substantially all traces of mother liquor adhering to the addition compound, and resolving the addition compound to produce substantially pure meta-cresol.

4. A method of separating meta-cresol from a liquid mixture comprising meta- and para-cresols and containing at least about 60% meta-cresol, which comprises adding phenol in amount sufficient to produce a mixture containing about 30% phenol, incorporating in said mixture a paraffinic petroleum solvent having a boiling range of from about 90° to 150° C., cooling the said mixture to a temperature of about 0° C. to crystallize out a solid phenol-meta-cresol addition compound substantially free of para-cresol, separating the said addition compound from the mother liquor while maintaining the said compound at a temperature of 0° C., washing the said compound with a paraffinic petroleum solvent boiling within the range of 90° to 150° C. to remove substantially all traces of mother liquor adhering to the addition compound, and resolving the addition compound to produce substantially pure meta-cresol.

5. In a process for isolating meta-cresol, the improvement which comprises washing a solid phenol-meta-cresol addition compound with a paraffinic hydrocarbon solvent.

6. In a process of isolating meta-cresol, the improvement which comprises washing a phenol-meta-cresol addition compound at a temperature within the range of −5° to +5° C. with a paraffinic hydrocarbon boiling within the range of from 90° to 150° C.

KARL H. ENGEL.

CERTIFICATE OF CORRECTION.

Patent No. 2,339,388.                                      January 18, 1944.

KARL H. ENGEL.

It is hereby certified that error appears in the printed specification of the above numbered patent requiring correction as follows: Page 1, second column, line 44, for "par cresols" read --para cresols--; page 2, second column, line 19, Example 2, for "292 parts" read --295 parts--; and that the said Letters Patent should be read with this correction therein that the same may conform to the record of the case in the Patent Office.

Signed and sealed this 28th day of March, A. D. 1944.

Leslie Frazer (Seal)                              Acting Commissioner of Patents.